(12) United States Patent
Mandavilly et al.

(10) Patent No.: US 10,873,371 B1
(45) Date of Patent: Dec. 22, 2020

(54) ANTENNA FOR MASSIVE MULTIPLE INPUT AND MULTIPLE OUTPUT (MMIMO)

(71) Applicant: Cisco Technology, Inc., San Jose, CA (US)

(72) Inventors: Satish Kumar Mandavilly, Milpitas, CA (US); Amitesh Shukla, San Ramon, CA (US); Manish Jhanji, Santa Clara, CA (US); Rakesh Mishra, Milpitas, CA (US); Subhash Kodnad, Dublin, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/544,427

(22) Filed: Aug. 19, 2019

(51) Int. Cl.
*H04B 7/0417* (2017.01)
*G06N 20/00* (2019.01)
*H04B 7/0426* (2017.01)
*H04B 7/0452* (2017.01)

(52) U.S. Cl.
CPC .......... *H04B 7/0417* (2013.01); *G06N 20/00* (2019.01); *H04B 7/0426* (2013.01); *H04B 7/0452* (2013.01)

(58) Field of Classification Search
CPC .. H04B 7/0452; H04B 7/0426; H04B 7/0417; G06N 20/00
See application file for complete search history.

(56) References Cited

U.S. PATENT DOCUMENTS

| 10,080,201 | B2 * | 9/2018 | Taite | H04W 4/025 |
| 10,461,421 | B1 * | 10/2019 | Tran | H01Q 3/46 |
| 2014/0058778 | A1 * | 2/2014 | McLarty | G06Q 10/1095 |
|  |  |  |  | 705/7.19 |
| 2019/0036573 | A1 * | 1/2019 | Park | H04B 7/0456 |

* cited by examiner

*Primary Examiner* — Vineeta S Panwalkar
(74) *Attorney, Agent, or Firm* — Merchant & Gould P.C.

(57) ABSTRACT

An antenna may be provided. First, a Machine Learning (ML) model may be used, at a predetermined time, to predict a probable location of at least one of a plurality of client devices. Next, spatial coordinates may be obtained for the probable location from the ML model. Then an antenna sub-array of an antenna array may be steered toward the spatial coordinates of the probable location. The antenna sub-array may be unallocated.

20 Claims, 5 Drawing Sheets

ANTENNA FOR MASSIVE MULTIPLE INPUT AND MULTIPLE OUTPUT (MMIMO)

TECHNICAL FIELD

The present disclosure relates generally to antenna devices and their use in wireless communication applications.

BACKGROUND 5G networks are digital cellular networks in which the service area covered by providers is divided into small geographical areas called cells. Analog signals representing sounds and images are digitized in a phone, converted by an analog to digital converter, and transmitted as a stream of bits. The 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection. Like existing cellphones, when a user crosses from one cell to another, their mobile device is automatically "handed off" seamlessly to the antenna in the new cell.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
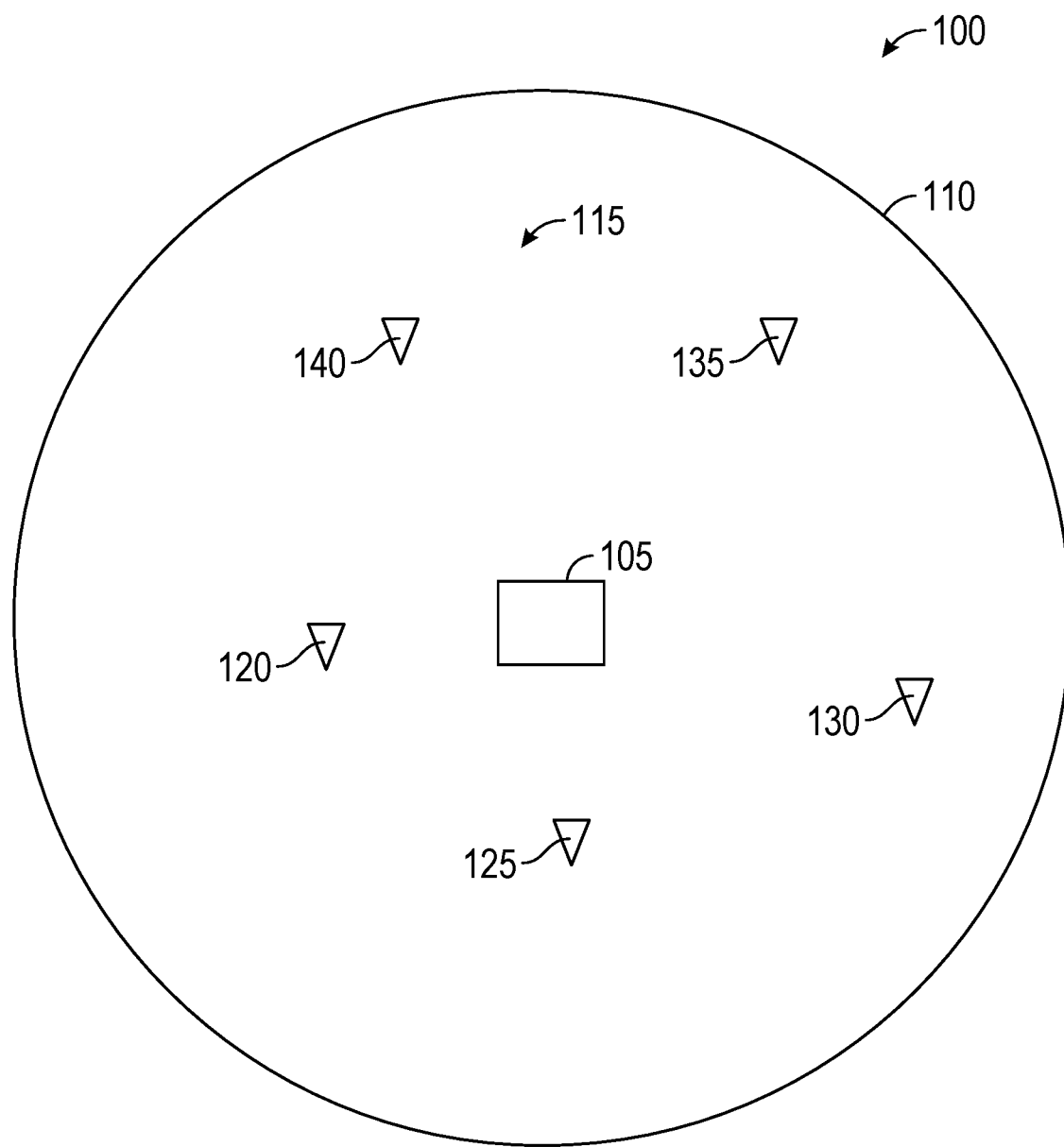
FIG. 1 is a block diagram of an operating environment.

An antenna may be provided. First, a Machine Learning (ML) model may be used, at a predetermined time, to predict a probable location of at least one of a plurality of client devices. Next, spatial coordinates may be obtained for the probable location from the ML model. Then an antenna sub-array of an antenna array may be steered toward the spatial coordinates of the probable location. The antenna sub-array may be unallocated.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

In 5G millimeter wave backhaul networks, most antennas are distributed and arranged in an array that focuses over a Synchronization Signal Block (SSB). Each SSB may have sub-arrays of antennas. For example, during client device (i.e., User Equipment (UE)) call establishment, a gNodeB may allocate a few antennas from the sub-array. The allocated antennas may steer toward the client device in the SSB to form a better beam. The time to steer the antenna depends on the current focus direction and transmission power of the antenna and the client device location. If the antenna's focus is towards the client device's location, then the lagging time may be less. However, if the antenna's focus is further away from the client device's location, then the lagging time may be larger. If the lagging time is optimized, more client devices may be latched in the network with reduced noise, which may improve the SSB efficiency and hence improving network capacity and coverage. Optimizing the lagging time may also improve the thermal performance of system hardware, which may result in higher system availability via lower hardware failure rates. Accordingly, embodiments of the disclosure may provide a process to reduce the lagging time, which may improve cell coverage and may provide client devices with better signal strength and optimize data throughput.

FIG. 1 shows an operating environment 100. As shown in FIG. 1, operating environment 100 may comprise a base station 105, a cell 110, and a plurality of client devices 115. Base station 105 may provide wireless network access for plurality of client devices 115 and cell 110 may illustrate the coverage area of base station 105. Plurality of client devices 115 may comprise a first client device 120, a second client device 125, a third client device 130, a fourth client device 135, and a fifth client device 140. Each one of plurality of client devices 115 may comprise, but is not limited to, a smart phone, a personal computer, a tablet device, a mobile device, a cable modem, a cellular base station, a telephone, a remote control device, a set-top box, a digital video recorder, an Internet-of-Things (IoT) device, a network computer, a mainframe, a router, or other similar microcomputer-based device.

Base station 105 may implement Massive Multiple-input and Multiple-output (mMIMO) in cell 110 with plurality of client devices 115. mMIMO may comprise a process for multiplying the capacity of a radio link using multiple transmission and receiving antennas to exploit multipath propagation. MIMO may include base station 105 sending and receiving more than one data signal simultaneously over the same radio channel by exploiting multipath propagation.

The elements described above of operating environment 100 (e.g., base station 105, first client device 120, second client device 125, third client device 130, fourth client device 135, and fifth client device 140) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 5, the elements of operating environment 100 may be practiced in a computing device 500.

Figure 2A:
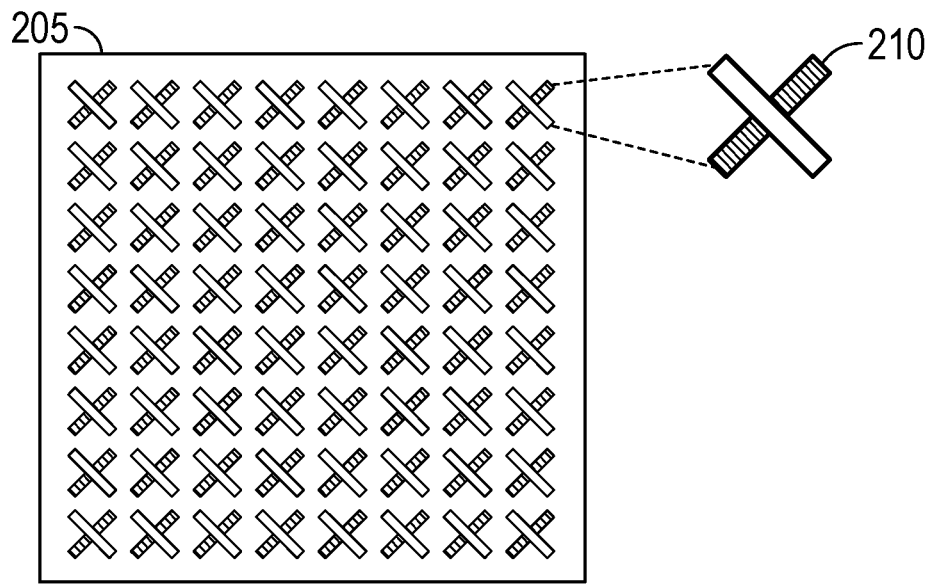
FIG. 2A and FIG. 2B illustrate an antenna array.
Figure 2B:
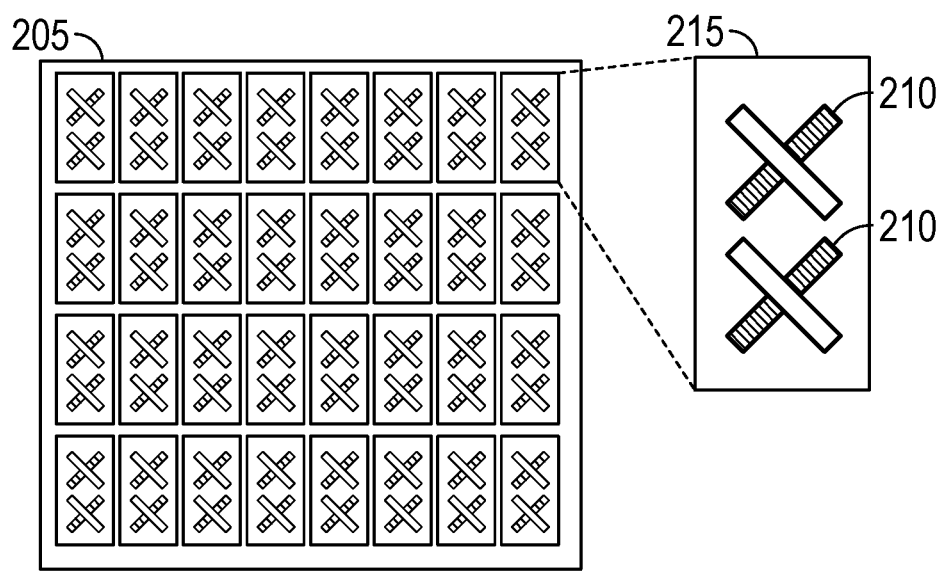

FIG. 2A and FIG. 2B illustrate an antenna array 205 that may be associated with base station 105 of FIG. 1 in order to implement mMIMO. Antenna array 205 may comprise a plurality of individual dual-polarized antenna elements 210 that may be arranged in rows and columns for example. Dual-polarized antenna elements 210 of an antenna array 205 may be capable of sending signals to and receiving signals from a number of client device (e.g., plurality of client devices 115) concurrently present in cell 110. Antenna array 205 may be divided into antenna sub-arrays 215 with each antenna sub-array 215 connected to two radio chains, normally one per polarization for example.

Antenna array 205 may be distributed across cell 110 forming multiple SSB beams creating a grid of beams covering cell 100. During call initialization, plurality of client devices 115 may searches for, measure the beams, and maintain respective sets of candidate beams that have higher signal strength. Physical cell ID and beam ID may comprise identification separating the beams. Distribution of antenna array 205 may help base station 105 to focus on client devices with direct lines of site to avoid interference and to have better coverage. Antenna array 205 (i.e., a Remote Radio Unit (RRU)) may be connected to a Base-Band Unit (BBU) with a high speed serial link.

In conventional Frequency Division Duplex (FDD) MIMO systems, after a primary and secondary synchronization, downlink Channel State Information (CSI) may be acquired by a client device during a training period and returned to the base station through feedback links. Vector quantization or codebook-based techniques are usually adopted to reduce the feedback overhead. However, these conventional techniques are not scalable with the number of transmits antennas in a MIMO regime. Accordingly, embodiments of the disclosure may provide a process to reduce the lagging time, which may improves cell coverage and may provide client devices with better signal strength and optimize data throughput.

Figure 3:
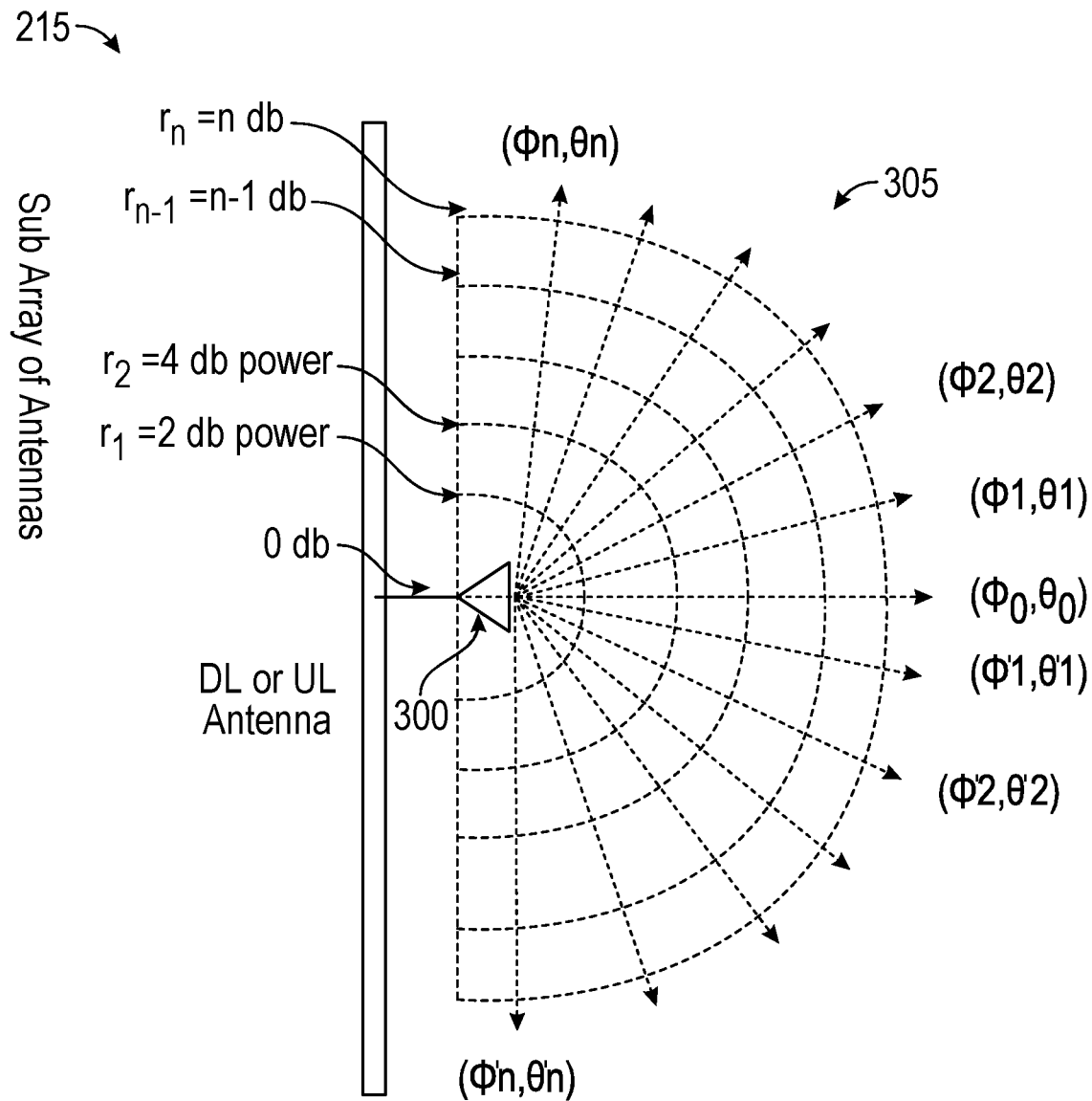
FIG. 3 illustrates an antenna sub-array spatial domain.

FIG. 3 illustrates antenna sub-array 215 in a spatial domain. As shown in FIG. 3, element 300 represents an antenna for downlink or uplink transmission that has a beam area 305. Beam area 305 may be subdivided into a spatial grid of angular rotation (e.g., theta/$\theta$), phase shift (e.g., phi/$\Phi$), and power (e.g., r in decibels). During provisioning, base station 105 may configure a maximum and a minimum value for these three parameters for transmit (Tx) and for receive (Rx). For the example shown in FIG. 3, base station 105 may provision with following parameters:

Minimum power value 0
Maximum power value r
Delta value 2 bB (delta r)
Minimum theta value $\theta_n$
Maximum theta value $\theta_n'$
Delta theta value as delta $\theta$
Minimum phi value $\Phi_n$
Maximum phi value $\Phi_n'$
Delta phi value as delta $\Phi$ Embodiments of the disclosure may provide a Machine Learning (ML) process that may help predict probable client device locations in cell 110. Based upon an input, an ML model may return spatial coordinates (e.g., an angular rotation (i.e., $\theta$), a phase shift (i.e., $\Phi$), and a power value (i.e., r)) corresponding to the predicted probable client device location. Then, using the spatial coordinates, an unallocated antenna (e.g., antenna sub-array 215) may be steered (i.e., focused) on the predicted probable client device location. The steering of the unallocated antenna may not affect the existing infrastructure, but may help to improve the network capacity and coverage. The lag time may be improved so that the client device may have better signal strength and may achieve optimum data throughput.

Figure 4:
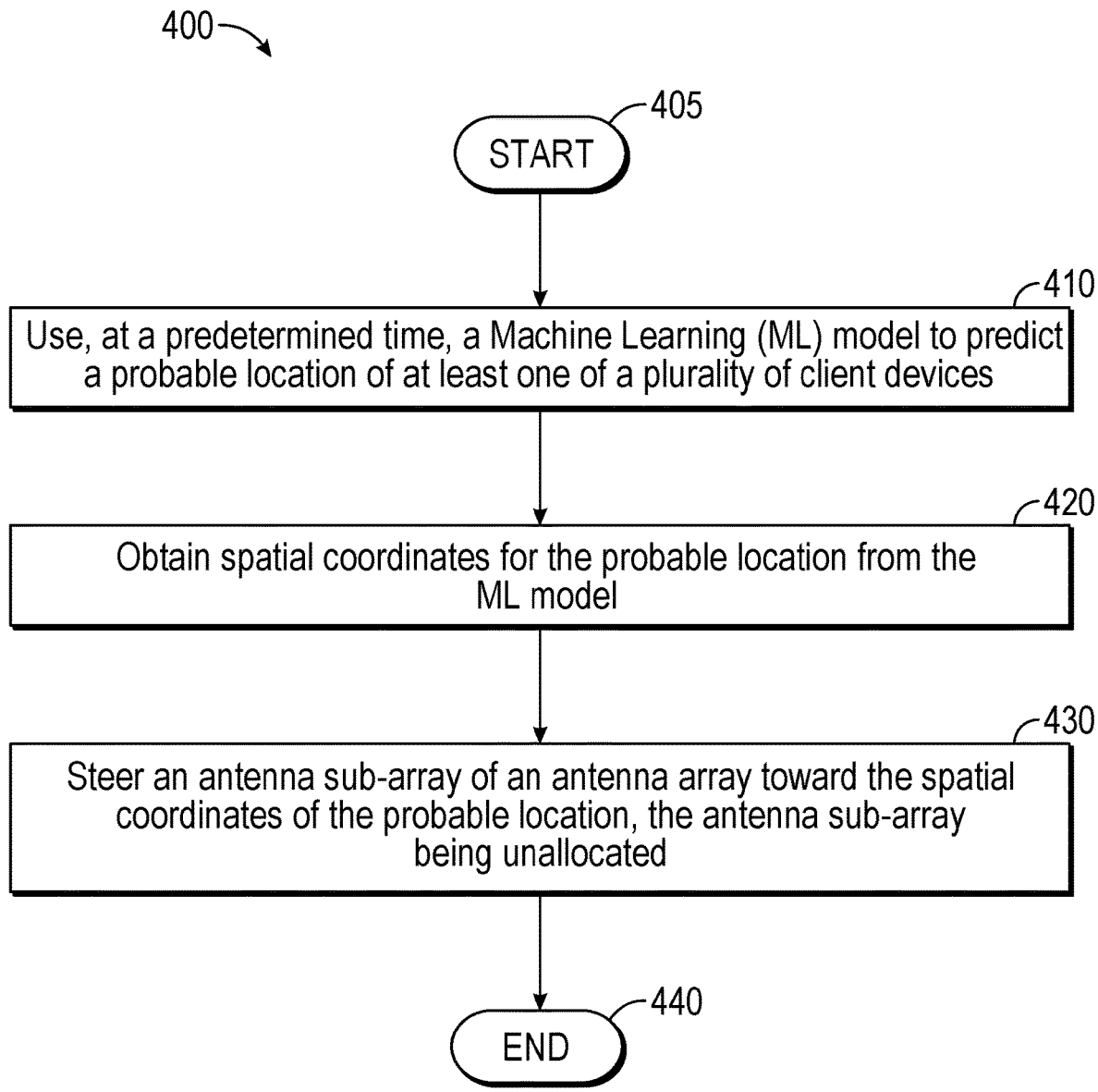
FIG. 4 is a flow chart of a method for providing an antenna.

FIG. 4 is a flow chart setting forth the general stages involved in a method 400 consistent with an embodiment of the disclosure for providing an antenna. Method 400 may be implemented using a base station 105 as described in more detail above with respect to FIG. 1. Ways to implement the stages of method 400 will be described in greater detail below.

Method 400 may begin at starting block 405 and proceed to stage 410 where base station 105 may use, at a predetermined time, a Machine Learning (ML) model to predict a probable location of at least one of plurality of client devices 115. For example, the location of client devices within cell 110 may vary temporally and based upon other factor associated with cell 110. As will be described in greater detail below, an ML model may be trained and then used to help predict probable locations of client devices in cell 110. Data corresponding to current temporally conditions and other factor associated with cell 110 may be fed into the ML model to help it predict the probable location.

From stage 410, where base station 105 uses the ML model to predict the probable location of at least one of plurality of client devices 115, method 400 may advance to stage 420 where base station 105 may obtain spatial coordinates for the probable location from the ML model. For example, at every time interval "t", a BBU associated with base station 105 may use the ML model to determine a number of unallocated antenna sub-arrays that may be focused on a specific grid in cell 110. Spatial coordinates (e.g., $\theta$, $\Phi$, and r) associated with the specific grid may be obtained from the ML model. The BBU may then pass these spatial coordinates to at least one unallocated antenna sub-array (e.g., antenna sub-array 215) in antenna array 205.

A pattern mining process may help to identify a client device location. Pattern mining processes may be used to identify the pattern of movement of an already latched client device within a cell area (e.g., the most probable next position within the cell), thus providing additional inputs among others to the system. Processes like frequent itemset mining, may help identify items that happen frequently together in large transactions or "sequential mining" identifying the order in which they happen. These two are just few examples among others that may be deployed. Here the items may comprise spatial locations during client device movement. Such a data set may be complex and large on which pattern mining algorithms like Apriori, Frequent Pattern (FP)-Growth, Sequential Pattern Discovery using Equivalence classes (SPADE), PrefixSpan, etc. may be applied. At every given iteration of interval "t", the pattern mining process may check the pattern of call connectivity and may predict the client device position in cell 110 (e.g., beam area 305). Based on the prediction, the BBU may then allocate at least one antenna sub-array to the selected grid associated with the spatial coordinates.

Once base station 105 obtains the spatial coordinates for the probable location from the ML model in stage 420, method 400 may continue to stage 430 where base station 105 may steer antenna sub-array 215 of antenna array 205 toward the spatial coordinates of the probable location. Antenna sub-array 215 may be unallocated prior to being steered toward the spatial coordinates of the probable location. For example, the BBU may provide the spatial coordinates (e.g., θ, Φ, and r) associated with the probable location to the unallocated antenna sub-array (e.g., antenna sub-array 215) in antenna array 205. The unallocated antenna sub-array may then steer toward the provided spatial coordinates. The BBU may also go in to an auto-correction mode and may move the antenna back to a free pool if it is unable to predict the client device location. In addition, the free pool may be driven by two more factors: i) a user configured pool capacity in which a set of antennas are always present in the free pool by opting out of the process; and ii) upon client device session disconnection, the antenna serving this client device becomes part of the free pool. Prediction and auto-correction may be performed continuously by the BBU. After base station 105 steers antenna sub-array 215 of antenna array 205 toward the spatial coordinates of the probable location in stage 430, method 400 may then end at stage 440.

Embodiments of the disclosure may also use a controller (e.g., a mMIMO controller). The controller may comprise, but is not limited to, a software module deployed in the cloud, Multi-access Edge Computing (MEC), or a backend server. It may continuously learn and adapt to any usage pattern shift in, for example, cell 110. The responsibilities the controller may comprise the following. For example, the controller may collect antenna parameters corresponding to base station 105 in real time, periodically or in batches based on agreements between the entities and applied policies associated with cell 110. Furthermore, the controller may train the aforementioned ML model on the data provided by antenna array 205 and procured from other external sources. The controller may notify antenna array 205 with any adjustment that may need to be made in antenna positioning that may help reduce the rotation of any antenna sub-array of antenna array 205. In addition the controller may receive metrics from antenna array 205 as feedback if it has to make further adjustments in θ, Φ, and r as compared to what initially recommended. This feedback may help to further minimize the training errors for higher accuracy. For example, if the controller suggests a particular δ value x, whereas the client device actually latched at x+delta(x), then delta (x) may be fed back to the deployed ML model for reducing errors in predictions. The controller may also maintain light instances of each antenna and corresponding parameters to provide per antenna adjustments.

As stated above, the ML model may be trained using data provided by the antenna and data procured from external sources. An input feature vector may be fed into the ML model that may produce predicted values for θ, Φ, and r for sub-arrays of a given antenna array. To train the ML model, the following data may be used.

Angular_rotation (θ), phase_shift (Φ), power (r): Each provide partial information of the client device in physical space (e.g., three different input vectors, together may represent the client device spatial location).

Weather data from an external source: For example, based on whether it is rainy or sunny, people with their client devices may be located at different places in cell 110. This may comprise information to help identify antenna usage patterns. In some situations (e.g., open areas of the cell coverage), weather may change the client device's position pattern on certain time and days, hence this data may help the ML model to learn the pattern deviations in such scenarios.

Data extracted from maps: For example, on a given floor, the floorplan may provide information about the area such as a sitting area, a vacant area, or areas with movement in cell 110 for example. Data mining/ML processes may identify and extract some variance of the data using this information. Other examples may comprise stadiums, concert halls, etc. In other words, embodiments of the disclosure may utilize a location of an antenna array on a floor map relative to the type of areas (i.e., sitting, etc.) described previously and provide relative location (e.g., pixel coordinates) information to the ML process.

Number of active antennas: This may provide information on the number of users latched to sub-arrays of a given antenna array.

Day of the Week: Usage patterns may change based on the day. For example, weekends may have different pattern as compared to weekdays.

Month of the year: Usage pattern may change based on the month. For example, the Christmas season may have a higher concentration and specific pattern of usage in a particular area.

Date: This may potentially hold information for time series modelling, if multiyear data is available.

Calendar Data: External data for a particular location containing information such as holidays, events, etc. The ML model may potentially extract some information on the number of users in a particular location. Combined with other data points, this data may assist prediction of the antenna angle and power required with increased accuracy.

Geographic location information of the antenna array.

Time of the day.

Antenna array and sub-array information.

Data collected from client devices.

Sensor data, which may be useful for IoT devices

The above list may provide robust information for the ML models to predict the antenna spatial positions. This list is an example, and other information may be used consistent with embodiments of the disclosure.

Additional available data may be fed into the ML model to further improve the accuracy, or some of the features may be dropped by applying feature reduction techniques such as Principal Component Analysis or statistical significance. The ML model may predict θ, Φ, and r for sub-arrays of a given antenna array as well as a recommendation on which sub-array of the antenna may be engaged.

Consistent with embodiments of the disclosure and as described above, there may be a high chance that the antenna array may show distinct behavior at different time/day/month, basically any seasonal pattern. To extract temporal information, embodiments of the disclosure may use a Time Series Analysis of the input data for forecasting the angles (i.e., θ and Φ) and distance (i.e., r) of sub-arrays of a given antenna array. Consistent with other embodiments of the disclosure, certain locations may not show much of temporal characteristics. In this case, regression models for such locations to predict the antenna parameters may be used. These models may comprise, for example, decision trees, logistics, simple linear regression, or any other regression models. What works best may be identified in the ML modelling stage. Moreover, various models may be combined to verify if this helps to provide better predictions. Furthermore, Deep Learning and Reinforcement Learning processes may perform well in some scenarios although they may take a different approach as compared to classical ML processes. Also, processes like Support Vector Machine (SVM), gradient boost, etc. may be used by embodiments of the disclosure.

An antenna array, consistent with embodiments of the disclosure, may provide or assist in data collection for the controller, provide a feedback loop to the controller on the residual errors, or apply or reject the recommendations from the controller based on the configuration. The system may provide configuration control to opt out of the mechanism so that, based on the situation, an antenna may safely ignore the recommendations. Moreover, participating antenna arrays may take action in accordance to the recommendations from the controller.

Figure 5:
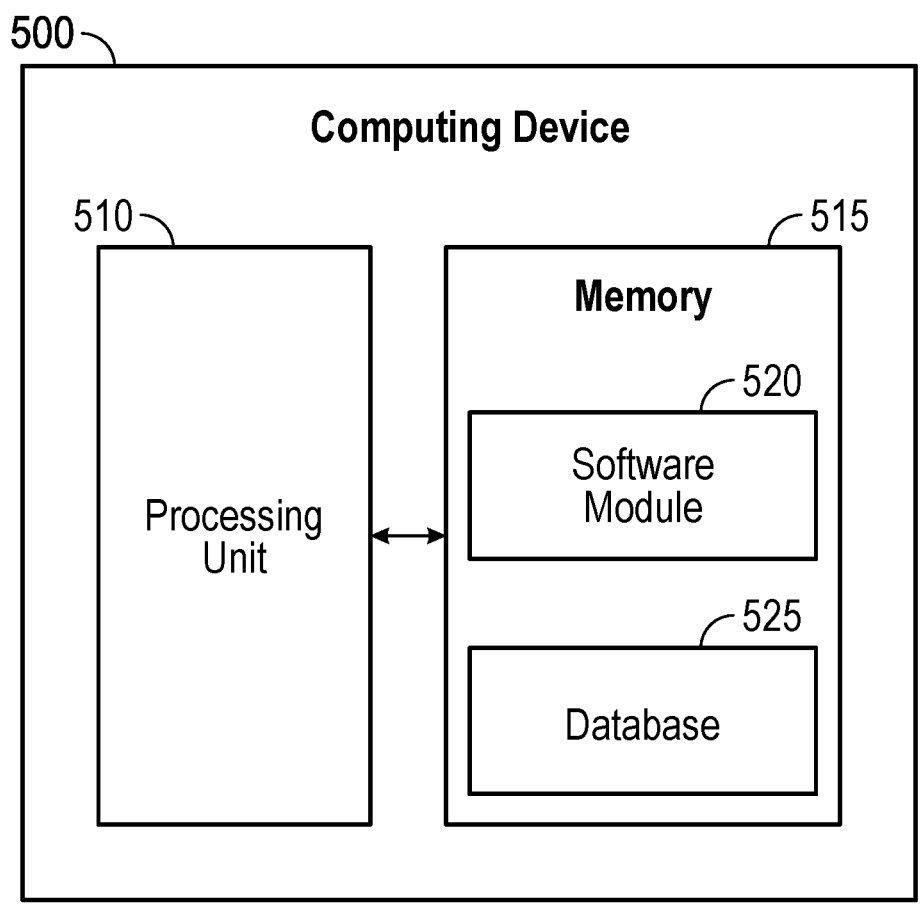
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for providing an antenna as described above with respect to FIG. 4. Computing device 500, for example, may provide an operating environment for base station 105, first client device 120, second client device 125, third client device 130, fourth client device 135, or fifth client device 140. Base station 105, first client device 120, second client device 125, third client device 130, fourth client device 135, and fifth client device 140 may operate in other environments and are not limited to computing device 500.

Computing device 500 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    using, by a computing device at a predetermined time, a Machine Learning (ML) model to predict a probable location of one of a plurality of client devices in a cell comprising a beam area of an antenna array operative to send and receive signals from the plurality of client devices;
    obtaining spatial coordinates with respect to the antenna array for the probable location of the one of the plurality of client devices from the ML model; and
    steering an antenna sub-array of the antenna array toward the spatial coordinates of the probable location of the one of the plurality of client devices, the antenna sub-array being unallocated.

2. The method of claim 1, wherein obtaining spatial coordinates comprises obtaining spatial coordinates comprising an angular rotation value, a phase shift value, and a power value associated with the probable location of the one of the plurality of client devices.

3. The method of claim 2, wherein steering the antenna sub-array toward the spatial coordinates of the probable location of the one of the plurality of client devices comprises focusing the antenna sub-array on the angular rotation value and the phase shift value and operating the antenna sub-array at the power value.

4. The method of claim 1, further comprising moving the antenna sub-array to a free pool when a client device does not latch on to the antenna sub-array.

5. The method of claim 1, further comprising latching a client device on to the antenna sub-array.

6. The method of claim 1, further comprising maintaining the ML model associated with probable locations of the plurality of client devices within a cell serviced by the antenna array.

7. The method of claim 6, wherein maintaining the ML model comprises training the ML model with data provided by the antenna array to create an input feature vector.

8. The method of claim 6, wherein maintaining the ML model comprises training the ML model with data external to the antenna array to create an input feature vector.

9. The method of claim 6, wherein maintaining the ML model comprises receiving feedback with respect to the probable location of the one of the plurality of client devices when an actual location at which a client device latched on the antenna sub-array is different from the probable location of the one of the plurality of client devices.

10. The method of claim 9, wherein maintaining the ML model comprises making an adjustment to the probable location of the one of the plurality of client devices in the ML model based on the feedback.

11. A system comprising:
    a memory storage; and
    a processing unit coupled to the memory storage, wherein the processing unit is operative to:
        use a Machine Learning (ML) model to predict a probable location of one of a plurality of client devices in a cell comprising a beam area of an antenna array operative to send and receive signals from the plurality of client devices;
        obtain spatial coordinates with respect to the antenna array for the probable location of the one of the plurality of client devices from the ML model; and
        steer an antenna sub-array of the antenna array toward the spatial coordinates of the probable location of the one of the plurality of client devices, the antenna sub-array being unallocated.

12. The system of claim 11, wherein the spatial coordinates comprise an angular rotation value, a phase shift value, and a power value associated with the probable location of the one of the plurality of client devices.

13. The system of claim 12, wherein the processing unit being operative to steer the antenna sub-array toward the spatial coordinates of the probable location of the one of the plurality of client devices comprises the processing unit being operative to focus the antenna sub-array on the angular rotation value and the phase shift value and operating the antenna sub-array at the power value.

14. The system of claim 11, wherein the processing unit is further operative to move the antenna sub-array to a free pool when a client device does not latch on to the antenna sub-array.

15. The system of claim 11, wherein the processing unit is further operative to latch a client device on to the antenna sub-array.

16. A non-transitory computer-readable medium that stores a set of instructions which when executed perform a method comprising:
    using, by a computing device at a predetermined time, a Machine Learning (ML) model to predict a probable location of one of a plurality of client devices in a cell comprising a beam area of an antenna array operative to send and receive signals from the plurality of client devices;
    obtaining spatial coordinates with respect to the antenna array for the probable location of the one of the plurality of client devices from the ML model; and
    steering an antenna sub-array of the antenna array toward the spatial coordinates of the probable location of the of the plurality of client devices, the antenna sub-array being unallocated.

17. The non-transitory computer-readable medium of claim 16, wherein obtaining spatial coordinates comprises obtaining spatial coordinates comprising an angular rotation value, a phase shift value, and a power value associated with the probable location of the one of the plurality of client devices.

18. The non-transitory computer-readable medium of claim 17, wherein steering the antenna sub-array toward the spatial coordinates of the probable location of the one of the plurality of client devices comprises focusing the antenna sub-array on the angular rotation value and the phase shift value and operating the antenna sub-array at the power value.

19. The non-transitory computer-readable medium of claim 16, further comprising moving the antenna sub-array to a free pool when a client device does not latch on to the antenna sub-array.

20. The non-transitory computer-readable medium of claim 16, further comprising latching a client device on to the antenna sub-array.

* * * * *